[11] 3,621,388

| | | | |
|---|---|---|---|
| [72] | Inventor | Robert D. Davis |
| | | Spring Valley, Calif. |
| [21] | Appl. No. | 773,156 |
| [22] | Filed | Nov. 4, 1968 |
| [45] | Patented | Nov. 16, 1971 |
| [73] | Assignee | Spectral Dynamics Corporation |
| | | San Diego, Calif. |

[54] ELECTRONIC WAVE ANALYZER FOR DETERMINING THE FREQUENCY AND AMPLITUDE OF COMPONENTS IN A COMPLEX WAVEFORM
14 Claims, 4 Drawing Figs.

[52] U.S. Cl. .................................................. 324/77, 179/1, 235/181
[51] Int. Cl. .................................................. G01r 23/16

[50] Field of Search ................................................ 324/57 A, 57 NA, 57 FP, 57 MI, 77, 57 H, 77 G; 235/181; 179/1 AS, 15.58

[56] References Cited
UNITED STATES PATENTS
2,605,396  7/1952  Cheek ........................... 324/57 UX
3,488,582  1/1970  Bayer et al. ................... 324/57

*Primary Examiner*—Edward E. Kubasiewicz
*Attorney*—Carl R. Brown

ABSTRACT: A wave analyzer capable of determining the amplitudes and phases of frequency components in a complex waveform. he selection of a frequency component is determined by the frequency of an external "tuning" signal source. The selectivity or ability to resolve frequency components close to each other is controlled by a manual or automatic bandwidth switching circuit or a voltage controlled continuously variable bandwidth circuit.

INVENTOR.
ROBERT D. DAVIS
BY
*Carl R. Brown*
ATTORNEY

INVENTOR.
ROBERT D. DAVIS

BY *Carl R. Brown*

ATTORNEY

ELECTRONIC WAVE ANALYZER FOR DETERMINING THE FREQUENCY AND AMPLITUDE OF COMPONENTS IN A COMPLEX WAVEFORM

BACKGROUND OF THE INVENTION

In the past there have been several known electronic wave analyzers. These known electronic wave analyzers may be categorized as the octave band analyzer, the fractional octave analyzer that is usually one-third octave, the constant percentage bandwidth analyzer, the distortion analyzer and the constant band analyzer that is usually of the heterodyne type. Reference to these types of wave analyzers can be found in Accoustic Measurements by Beranek, Chapter 12 pages 516 through 526.

The octave band and third octave band wave analyzers generally have a passive filter design, wherein an unknown signal is applied to the input of a parallel bank of filters and the amplitude of the components falling within the frequency bands of the analyzer and passed by the filters are indicated. The constant percentage analyzer has tuning elements with resistances and capacitances that are placed in the feedback circuit of an amplifier. The resistances and capacitances are made adjustable and the output of this selected circuit is fed to a suitable wide band amplitude indicator. While a limitation of the two categories of wave analyzers, including the constant percentage bandwidth wave analyzer, is that they require band-pass filters having sharp cutoff skirts for best spectrum separation, the primary limitation is that all of these types of analyzers are separate distinct instruments that, individually, have a limited usefulness.

The constant bandwidth type wave analyzers heretofore known to the art, are more versatile and useful and have generally been of the type wherein the signal to be analyzed is combined in a balanced modulator with a signal from an accurate, stable, tunable, local oscillator. The output of the balanced modulator passes through a highly selective tuned amplifier, tuned to a frequency that is higher than any of the frequencies contained in the unknown wave, and the output from the tuned amplifier is applied to a suitable amplitude indicator. The frequency of the local oscillator is adjusted so that the difference frequency between the local oscillator frequency and the component of the unknown waveform is equal to the center frequency of the tuned amplifier. Each component frequency of the unknown waveform is obtained individually by having its frequency translated to that of the tuned amplifier as the frequency of the tunable oscillator is varied, and the amplitude thereof is displayed on an amplitude indicator.

The heterodyne, or constant bandwidth type analyzers heretofore known have imposed severe restrictions on the tunable local oscillator. Highly stable, drift-free tunable oscillators have been required and provision made for extremely accurate tuning of the oscillators, requiring expanded scale, temperature compensation and very precision construction. As a result the local oscillator employed in such prior art wave analyzers of the constant bandwidth type have been bulky and expensive. Another shortcoming of these type of analyzers has been the required use of a very highly selective, tuned amplifier, using passive elements such as resistors, capacitors and inductors in the feedback loop of the amplifier, or the use of crystal lattice type filters or polyphase modulation arrangements with low-pass filters. But in employing these components, a fixed number of filter bandwidths are made available through mechanical switching. This switching causes switching transients and dropouts in the data that further requires additional elaborate circuits and expense to remove or reduce to a tolerable level.

The present invention allows all of the foregoing types of analyzers to be combined into one instrument. Additionally, the present invention overcomes the drift and stability requirements of the high frequency, tunable, local oscillator in the heterodyne type analyzers. Additionally, the invention provides a means to continuously adjust, manually or automatically, the *effective filter bandwidth and switch components to provide fixed bandwidth selections without generating transients or dropouts.

SUMMARY OF THE INVENTION

It is therefore an object of this invention to provide a new and improved wave analyzer for measuring the frequency, phase, and amplitude of the components of a complex wave.

It is another object of this invention to provide a new and improved wave analyzer that does not require a precision variable high-frequency oscillator.

It is another object of this invention to provide a new and improved wave analyzer of the constant or variable bandwidth type that doesn't require a critical high frequency selective amplifier or crystal lattice filters.

It is another object of this invention to provide a new and improved wave analyzer that can continuously vary the bandwidth or select different fixed bandwidths free of switching transients or dropouts.

It is another object of this invention to provide a new and improved wave analyzer of the constant bandwidth and variable bandwidth type.

It is another object of this invention to provide a new and improved wave analyzer with a filter bandwidth that can be programmed.

It is another object of this invention to provide a new and improved wave analyzer having a variable frequency tracking filter with programmable filter bandwidths and accurate, stable phase relationships through the wave analyzer.

In the present invention, a complex waveform or input data signal is applied to a balanced modulator where it is heterodyned with a high-frequency carrier signal. This carrier signal comprises the sum of a low-frequency tuning signal and a fixed reference high-frequency signal. These two signals are summed by a single side band technique and a carrier filter. The heterodyned output I.F. signal is passed through a phase coherent band-pass filter section. The band-pass filter technique used is based on polyphase modulations that translates the I.F. frequency down to the audio range, where it is relatively easy to design filters with the desired flat passband and sharp cutoff characteristics, and then restores the filtered signal to the original I.F. frequency.

In the I.F. band-pass filter, the I.F. signal is multiplied by the reference oscillator carrier in balanced modulators in both channels. This essentially translates the I.F. band of frequencies down to a new band centered at 0 c.p.s. with one of the resulting two sidebands consisting of "negative" frequencies. The carrier supplied to the lower modulator however, is 90° out of phase so that the resulting modulator output is 90° out of phase with the upper channel modulator output.

With the low pass filters switched into the circuits, for instance, only those I.F. signal components which are within Fc of the reference oscillator carrier will generate different frequencies low enough to pass through the filters, where Fc is the cutoff frequency of the low-pass filter. The audio range frequencies then are restored to the original I.F. frequency in a second pair of modulators.

The second modulator in the lower channel is also driven by a carrier which is 90° out of phase, so that the original I.F. output frequency is recovered in phase with the upper channel. The other "sideband," however, is 180° out of phase with the same sideband in the upper channel. These signal components therefore cancel each other in the summing circuit, while the desired signal components add. The audio range filter characteristics thus are translated to the I.F. frequency spectrum.

Since the generation of the data carrier signal used in the first data modulator comprises the same high-frequency reference oscillator as used for the carrier signal in the polyphase modulation selection, the I.F. frequency of the polyphase modulation remains constant, phase coherent and independent of the drift of the high-frequency reference oscillator.

The dual low-pass filter circuit is set to pass a substantially zero frequency or a low audiofrequency, accordingly, inexpensive filters may be used. In a modified embodiment of the invention the bandwidth of the low-pass filters may be selectively set by appropriately switching components in the low-pass filters in a manner that reduces the problem of creating switching transients. Also in another modified embodiment of my invention, the low-pass filters are switched out of the circuit and replaced with voltage controlled, low-pass filters. Well known programmable, selectively variable voltage output means supplies appropriate control voltages to the voltage controlled, low-pass filters. This allows the bandwidth of the dual low-pass filter circuit to be selectively varied to provide, as desired, the additional constant percentage bandwidth analysis, fractional octave bandwidth analysis and the octave bandwidth analysis.

The present invention also utilizes a phase lock loop circuit that is selectively switched into the circuit to remove unwanted signals that may be present in the single sideband generated data carrier signal. The removal of these spurious or unwanted components in the data carrier signals increases the dynamic operating range of the wave analyzer.

These and other objects and features of this invention will become more apparent from the following description and accompanying drawing that illustrates in a schematic diagram the circuit of this invention.

Figure 1:
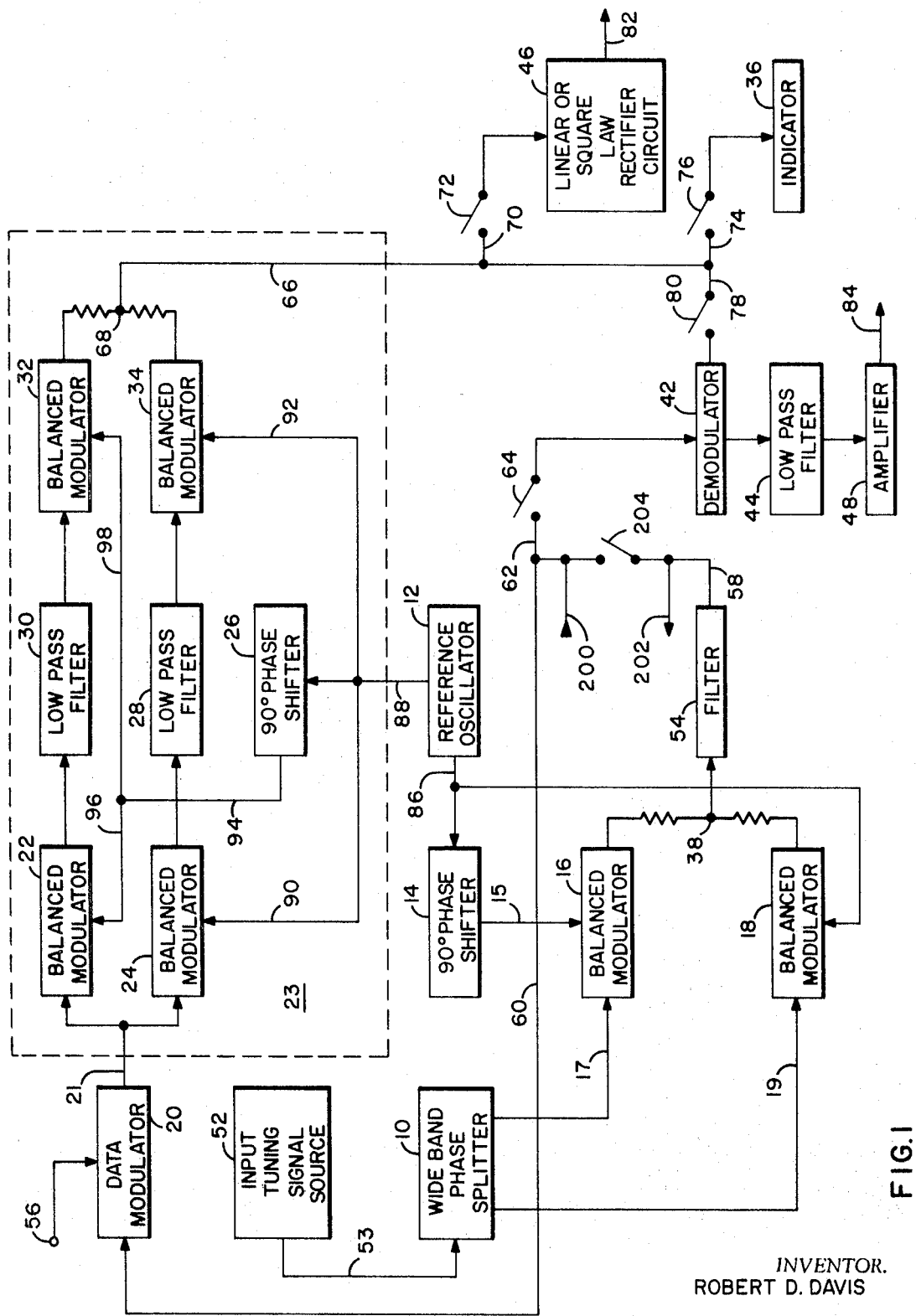
FIG. 1 is a block diagram of a wave analyzer embodying the present invention.

Referring now to FIG. 1 in the drawing, a complex electrical input signal to be analyzed is applied to input terminal 56 and fed to the data modulator 20. This complex input signal may be provided from any suitable source, such as from a vibration transducer fastened to a vibrating body or from a microphone exposed to a source of sound or from any other suitable source and may have a range of frequencies of interest, as for example, from 10 to 1,000 hertz. For the purpose of description of this invention, it is assumed that a particular frequency of interest in the complex signal, as for example 25 hertz, is chosen for analysis.

An input tuning signal source 52 provides a control frequency input tuning signal to line 53. The frequency of the input tuning signal has a frequency range that brackets the frequency range of all the possible frequencies of interest in the complex input signal applied to the input terminal 56. In normal operation of the invention, the frequency of the input tuning signal is selectively varied or tuned until the frequency is the same as the particular frequency of interest, for a purpose that will become more apparent hereinafter. The input tuning signal source 52 may comprise any suitable and controllable signal source such as, for example, a selectively variable frequency oscillator, an audio sweep oscillator, a tape machine, tachometer or any other suitable device. As previously stated, it is assumed that the frequency of interest in the complex input signal in line 56 is 25 hertz and thus the frequency of the tuning input signal in line 53 will also be 25 hertz.

The tuning signal is fed to the wideband phase splitter 10 that provides two output signals having substantially equal amplitudes and the same frequency, exemplarily the 25 hertz, with the signal fed to balanced modulator 16 being 90° out of phase with the signal fed to balanced modulator 18. A fixed frequency reference oscillator local high-frequency oscillator 12, that may comprise any suitable oscillator having a reasonably stable output, provides a reference frequency signal output to lines 86 and 88. The frequency output of the reference oscillator 12, for the purpose of this explanation, may be in the order of 100,000 hertz. The signal in line 86 is applied to the balanced modulator 18, and with a 90° phase shifter 16, is fed through line 15 to the balanced modulator 16.

Each of the balanced modulators 16 and 18 provide output signals that include the sum and difference frequencies of the reference oscillator 12 signal and the input tuning signal in lines 17 and 19. Thus both of the balanced modulators 16 and 18 provide 90° out of phase output signals of 100,025 hertz and 99,975 hertz, that are combined at summing junction 38. This results in one sideband being cancelled and the other sideband being accentuated and fed to a high-pass filter 54. By arrangement of the phase relationships, the 99,975 hertz signal is eliminated, the sum signal of 100,000 hertz is accentuated and any unwanted harmonics and the tuning signal that leaks through the balanced modulators is blocked by the filter 54.

The tuned carrier frequency signal of 100,025 hertz is fed through lines 58, through closed switch 204 and through line 60 to the data modulator 20. The data modulator 20 mixes the complex signal to be analyzed having a frequency of interest, which exemplarily is 25 hertz, with the signal in line 60 and provides a translated signal in line 21 that contains, for the purpose of this explanation, the frequencies of 100,050 hertz and 100,000 hertz. The translated signal in line 21, with these frequencies, is applied to the balanced modulators 22 and 24 of the polyphase modulator or zero I.F. filter 23.

In the zero I.F. filter or polyphase modulator 23, the same 100,000 hertz reference frequency signal output of the reference oscillator 12, that was supplied to line 86, is also supplied as a reference frequency carrier signal through line 88 to each of the balanced modulators 24 and 34 in the lower channel and through the 90° phase shifter 26 to the balanced modulators 22 and 32 in the upper channel. Since the reference frequency carrier signal applied to the upper channel balanced modulators 22 and 32 through respective lines 96 and 98 is 90° out of phase, the resultant balanced modulator 22 output to the low-pass filter 30 in the upper channel is 90° out of phase with the resultant balanced modulator 24 output to the low-pass filter 28. Accordingly, the input signal from line 21 is heterodyned with the 100,000 hertz reference frequency carrier signal in the balanced modulators 22 and 24 providing a plurality of sum and difference output frequencies that are 90° out of phase and generally comprise 200,050 hertz, 200,000 hertz, 50 hertz and a substantially zero hertz signal component. The substantially zero hertz signal component can be 1 or 2 cycles or may be substantially a direct current. The low-pass filters 28 and 30 may have any desired cutoff frequency and only pass signals below a given cutoff frequency, as for example below 5 hertz. Thus only those frequencies that have been translated down below 5 hertz will pass through the low-pass filters 28 and 30. This translates the I.F. band of frequencies down to a new band centered at zero hertz or to substantially a direct current.

The direct current or very low-frequency output of the balance modulators 22 and 24, results from modulating the 100,000 hertz input signal from the data modulator 20 with the 100,000 hertz reference carrier signal from oscillator 12. Since all the other output frequencies from modulators 22 and 24 are above 5 hertz, the direct current signal components pass through the low pass filters 28 and 30 to balanced modulators 32 and 34.

These low frequency or direct current components are restored to the original I.F. frequency of 100,000 hertz in the second pair of balanced modulators 32 and 34. The low-frequency or direct current signal outputs from low-pass filters 28 and 30 have a magnitude proportional to the relative magnitude of the 25 hertz frequency of interest component in the input complex signal supplied to line 56. These direct current signal outputs are chopped by the 100,000 hertz carrier signal to provide output signals of 100,000 hertz having magnitudes proportional to the magnitudes of the direct current signals. The second balanced modulator 32 in the upper channel is driven by the 100,000 hertz reference carrier signal that is 90° out of phase with the 100,000 hertz reference carrier signal applied to balance modulator 34 so that in the summing network 68, one of the sidebands is added and the other sideband is cancelled. Thus the low audio range filter characteristics of the low-pass filters 32 and 34 are translated to the I.F. frequency spectrum.

The output from the summing junction 68 is fed through line 66 to several indicator and readout devices that may be directly connected to line 66 or be selectively switched in and out of the circuit. By closing switch 72, the 100,000 hertz signal in line 66 passes through line 70 and closed switch 72 to a known linear or square law rectifier circuit 46 that provides a direct current analogue output to line 82. By closing switch 76, the signal in line 66 is applied through line 74 to an indicator 36 that may be a voltmeter, ampmeter or other suitable indicator device. Also by closing switches 64, and 80, the output signal in line 66, having a frequency of 100,000 hertz, is applied to one terminal of demodulator 42 through line 78. The tuned carrier frequency signal in line 58 of 100,025 hertz is applied through line 62 and switch 64 to the other terminal of demodulator 42. Demodulator 42 provides an output of the sum and different frequencies of the input frequencies providing output frequencies of 200,025 hertz and 25 hertz that are supplied to a low-pass filter 44 that filters out the 200,025 hertz component and allows the 25 hertz signal to pass through to amplifier 48 and output line 84. Thus the demodulation circuit 42 demodulates the output signal in line 66 to a frequency that is identical with the frequency of interest component in the complex signal analyzed and that has proportional amplitude and coherent phase. Thus the output in line 84 is the filtered signal output of the frequency of interest.

While switches 72, 76, 80 and 64 have been illustrated for selectively energizing the respective indicator circuits, it should be understood that the indicator circuits can be and normally are connected directly to line 66.

Figure 2:
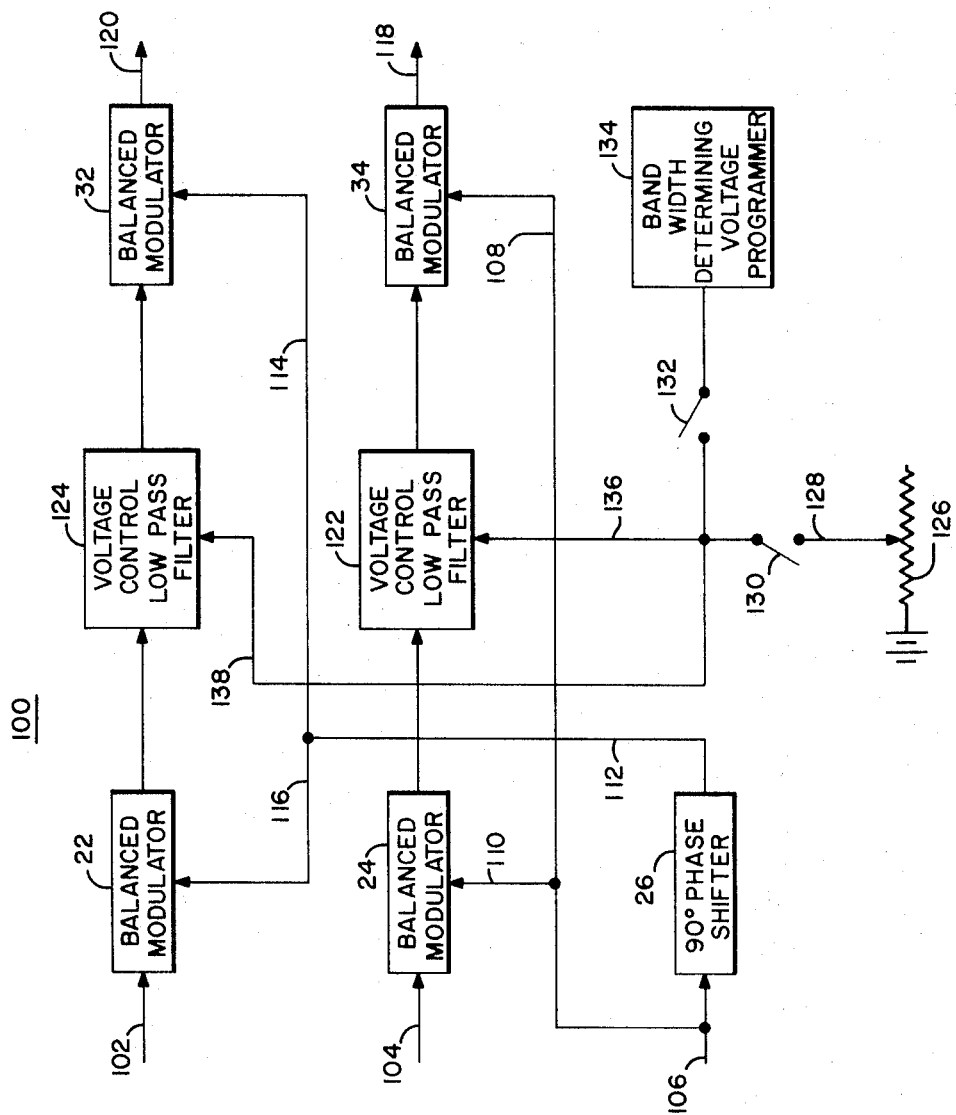
FIG. 2 is a block diagram of a modified zero I.F. filter circuit having voltage controlled low-pass filters for use in the wave analyzer illustrated in FIG. 1.

In analyzing the complex input signal applied to line 56, it is often desirable to analyze the frequency spectrum of the input complex signal in frequency bands having selective widths. Referring to FIG. 2, an embodiment of a zero I.F. filter 100 is illustrated wherein the low-pass filters 28 and 30 of FIG. 1 are replaced by known voltage control, low-pass filters 122 and 124. The modified zero I.F. filter circuit 100, as illustrated in FIG. 2, is substituted for the zero I.F. filter circuit 23 in FIG. 1. The voltage control low-pass filters 122 and 124 have a filter bandwidth that can be varied over any desirable ratio as a function of applied direct current voltage. Accordingly when switch 130 is closed a control means, such as a potentiometer 126 that for example may be a manually operated or motor operated pickoff 128, provides a selective direct current voltage through lines 136 and 138 to the voltage controlled, low-pass filters 122 and 124. This direct current control voltage selectively increases or decreases the bandwidths of filters 122 and 124 to, for example, 200 hertz, 1,000 hertz, 3,000 hertz, or to any suitable frequency bandwidth desired. A known bandwidth determining voltage programmer 134 may provide the control voltages in a manner that varies the voltage over a given or predetermined program, providing a direct current output through switch 132 and lines 136 and 138 that selectively enlarges or narrows, on a given program basis, the bandwidth of the known voltage control low-pass filters 122 and 124. This permits a programmed filter bandwidth that provides constant percentage bandwidth analysis, fractional octave bandwidth analysis and octave bandwidth analysis. Since the filter bandwidth can be controlled by a voltage proportional to the tuning signal, constant percentage filter bandwidth analysis can be provided with respect to the frequency of interest and this allows a digital computer or the like, through programmer 134, to set the filter bandwidth of the voltage control, low-pass filters automatically, as a function of data characteristics or programmed analyzer format. In other operational and display functions, the zero I.F. filter circuit 100 in FIG. 2 functions in the same manner as the zero I.F. filter circuit 23 illustrated in FIG. 1, wherein filters 28 and 30 essentially pass low-frequency or direct current.

In operation of the embodiments illustrated in FIGS. 1 and 2, the carrier frequency from the reference oscillator 12 to the zero I.F. filters 23 and 100 is the same as the frequency output signal of the reference oscillator 12 to line 86. Thus any drift in the reference oscillator 12 output frequency will cause the same corresponding drift in the tuned carrier frequency in line 58, and errors that could otherwise result from drift of the reference oscillator 12 are compensated.

The zero I.F. filter circuits 23 and 100 translate the frequency of interest at the I.F. frequency down to the low audio range where it is relatively easy to design inexpensive filters, as for example the low-pass filters 28 and 30, with the desired flat pass band and sharp cutoff characteristics. These low audio range filters may use active R.C. filters that do not have difficult hum shielding problems associated with the large inductance required by low-frequency LC filters. These filters are also less temperature sensitive with respect to their bandwidth or center frequency than are the more expensive crystal lattice type I.F. filters that represent temperature stability problems. Accordingly, the zero I.F. filter provides selectable I.F. bandwidths at very low cost. Further in the zero I.F. filter, the direct current or very low-frequency component passed by the low-pass filters 28 and 30 provides no phase shift. This facilitates accurate and stable phase measurements between two analyzer units, because the low-pass filters have zero phase effect at direct current and by using the reference oscillator 12 signal to heterodyne up and to heterodyne down, it is assured that the signal outputs from the balanced modulators 22 and 24 will always be at the center of the low-pass filters.

Figure 3:
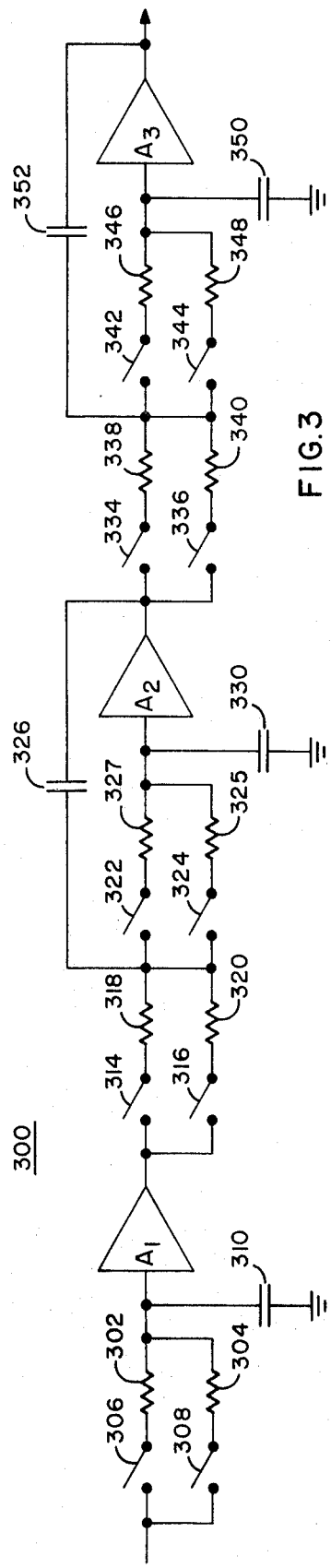
FIG. 3 is an illustration of a low-pass filter having selectively set bandwidths for alternative use in the wave analyzer.
Figure 4:
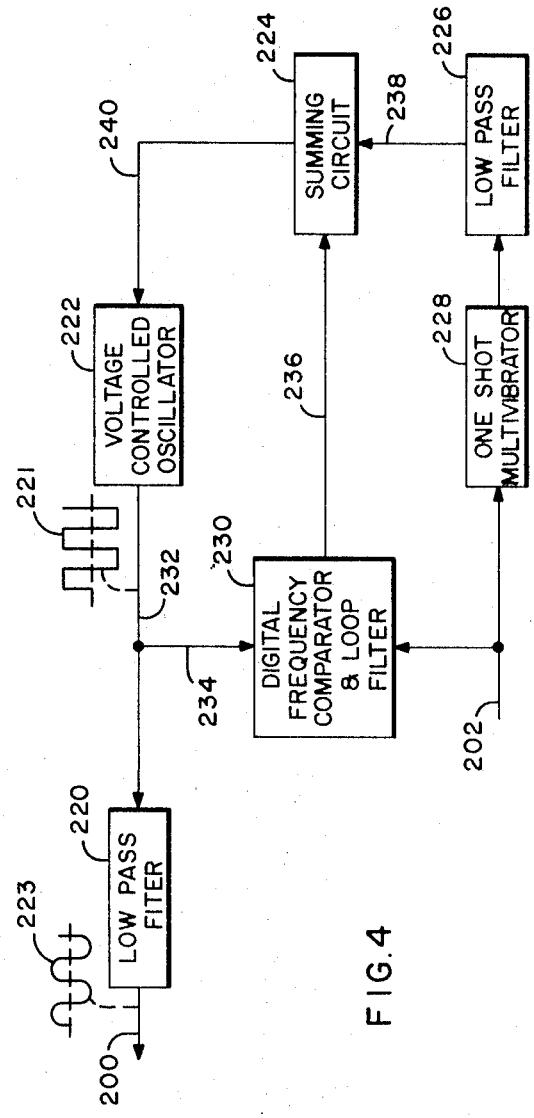
FIG. 4 is a block diagram of a phase lock, loop circuit for use in the embodiment of the wave analyzer of this invention.

In the operation of the wave analyzer circuit illustrated in FIG. 1, it is often advantageous to selectively set the bandwidth of the low-pass filters 28 and 30 without using the voltage control low-pass filters 122 and 124 illustrated in FIG. 2. The approach in the past has been to switch entire filters or to switch a combination of resistors and capacitors. This mode of operation and switching requires a settling time before valid data is available. In the embodiment of FIG. 3, a low-pass filter circuit 300 is employed that has means for switching resistances in and out of the filter circuit to change the bandwidth without providing a low-impedance path to discharge the capacitors during switching. In the low-pass filter circuit 300, a plurality of high-impedance buffer amplifiers or voltage followers A1, A2, and A3 are in a network with a plurality of separate resistance elements and capacitors. The bandwidth of the low-pass filter 300 is changed by selectively switching appropriate ones of resistors 304, 320, 325, 340 and 348 for resistors 302, 318, 327, 338, and 346. A plurality of switches 306, 308, 314, 316, 322, 324, 334, 336, 342 and 344 are selectively actuated by hand, relays or any other suitable means to selective switch the resistors in a manner in which the amplifiers and capacitors do not have a low-impedance discharge path. For example, when it is desired to switch resistors 304, 320, 325, 340 and 348 for resistors 302, 318, 327, 338 and 346, switches 306, 314, 322, 334 and 342 are opened and switches 308, 316, 324, 336 and 344 are closed. It may be seen that during this switching operation there is no appreciable low-impedance paths to discharge the capacitors 310, 326, 330, 350 and 352. Other switches may be similarly operated to change resistors and the resultant bandwidth. Each of the low-pass filters 28 and 30 may be provided with the filter circuit illustrated in FIG. 3 and with appropriate coordinated controls for switching corresponding resistors in the sequence and manner described in each circuit.

Where it is desired to use the wave analyzer in its large dynamic range and where rapid processing of signals is not a critical requirement, then the phase lock loop circuit of FIG. 4 is switched into the lines 58 and 60 by opening switch 204. The phase lock loop circuit removes unwanted signals that may be present in the frequency signal in line 58. Single sideband generators, such as the single sideband generator in FIG. 1, comprising The wideband phase splitter 10, 90° phase shifter 14, the balance modulators 16 and 18 and the summing circuit 38, generate two quadrature sideband signals and then sums the two signals together to cancel one of the sidebands and accentuates the other sideband. However some minute amount of the carrier signal and the unwanted sideband signal as well as harmonic related products of the basic signal and the carrier signal may be present in the output of the desired sideband signal. Thus when the desired sideband signal is supplied to line 58 and the remainder of the circuit, these minute, low magnitude, unwanted signals can limit the precision of the large dynamic range of the analyzer, such as below 60 db. from full scale.

Referring to FIG. 4 there is illustrated a phase lock loop circuit that is connected to lines 200 and 202 of FIG. 1. The input high frequency from line 58 is fed through line 202 to the one shot multivibrator 228 and the digital frequency comparator and loop filter 230 when switch 204 is open. The one shot multivibrator provides a constant energy pulse at each positive or negative axis crossing of the input high-frequency signal from line 202. These pulses when averaged in the lowpass filter 226 provides a direct current voltage proportional to the high-frequency input signal. The direct current signal in line 238 passes through the summing circuit 224 and drives the voltage controlled oscillator 222 within a few cycles of the input frequency. The small error is due to both the accuracy of the direct current voltage proportional to frequency and the linearity of the voltage controlled oscillator direct current voltage to frequency transfer.

The output of the voltage controlled oscillator passes from line 232 to line 234 and goes to the digital frequency comparator 230. There the signal on line 234 is compared with the input signal on line 202. The digital frequency comparator provides a direct current signal output of one polarity if the input frequency is higher than the voltage controlled oscillator frequency and the opposite polarity when the input frequency is lower than the voltage controlled oscillator frequency. During the time the frequencies are equal, the phase between the two signals is proportional to the duty cycle of the output signal. The output signal of the digital frequency comparator is averaged to a direct current signal in the loop filter and is fed to the summing circuit 224 on line 236. The signal in line 236 is added to the direct current voltage proportional to frequency in line 238 in the summing circuit 224. The control signal in line 240 now contains both the direct current voltage proportional to frequency signal in line 234. The sum voltage now drives the voltage controlled oscillator to the exact frequency of the incoming signal in line 202. The low-pass filter 220 removes the harmonic components in the output signal 221 of the voltage controlled oscillator providing a substantially sine wave output signal 223 to output lines 200 and 60.

It should be understood from the foregoing description that the phase lock circuit of FIG. 4 when switched into the circuit, provides an output frequency signal having the same frequency as the accentuated sideband signal supplied to line 58 with the unwanted signal components removed. Also the phase lock circuits provide a substantially even magnitude output signal, thus removing problems that can result from varying magnitudes. Thus the analyzer is capable of operating at large dynamic ranges where the magnitude of the unwanted signal components would have interfered with the subsequent signal analysis.

While there has been disclosed hereinabove certain preferred embodiments of this invention, it will be understood that various changes and modifications may be made therein without departing from the scope of the invention as defined in the appended claims.

Having described my invention, I now claim.

1. A wave analyzer for analyzing a complex signal by a frequency tuned carrier signal comprising, means for providing a reference signal having a given frequency, means for providing a tuned signal having a frequency corresponding to a frequency of interest in the complex signal, means for heterodyning the reference signal with said tune signal and producing a tuned carrier signal that comprises the sum frequency of the reference signal frequency and the tuned signal frequency, data modulator means for modulating the tuned carrier signal with the complex signal producing translated signals, and means for polyphase modulating the translated signals with the reference signal producing an output signal having the frequency of the reference signal and the amplitude of the frequency of interest in the complex signal.

2. A wave analyzer for analyzing a complex signal as claimed in claim 1 in which, the polyphase modulating means having first and second circuit channels, each of the circuit channels having voltage control low-pass filter means responsive to voltage signals for selectively varying the frequency bandwidth of each of the filters, and means for supplying voltage signals to each of the voltage control low-pass filters.

3. A wave analyzer for analyzing a complex signal as claimed in claim 2 in which, the voltage signal supply means including means for selectively varying the magnitude of the voltage signals.

4. A wave analyzer for analyzing a complex signal as claimed in claim 2 in which, the voltage signals supplied by the voltage signal supply means comprising direct current voltages, and means for selectively varying the magnitudes of the direct current voltages over a given program.

5. A wave analyzer for analyzing a complex signal as claimed in claim 1 in which, the polyphase modulating means comprising first and second circuit channels, each of the channels having a first modulator for receiving the translated signals, connected in series with a low-pass filter connected in series with a second modulator, means for supplying the reference frequency to each of the first and second modulators in the first channel and supplying the reference frequency with a 90° phase shift to each of the first and second modulators in the second channel, and summing means for summing the signals received from the second modulators in each of the channels.

6. A wave analyzer for analyzing a complex signal as claimed in claim 5 in which, the low-pass filters in each of the first and second channels comprising voltage control low-pass filter means responsive to voltage signals for selectively varying the frequency bandwidth of each of the filters, and means for supplying voltage signals having selective magnitudes to each of the voltage control low-pass filters.

7. A wave analyzer for analyzing a complex signal as claimed in claim 5 in which, each of the low-pass filters in each of the first and second channels comprising a plurality of filter circuits connected in series, at least one of the filter circuits including amplifier means, the input circuit to the amplifier means comprising at least two groups of parallel connected resistive elements, which groups are connected in series, a first capacitor connected at one side to the series connection between said groups of parallel connected resistive elements and at the other side to the output of the amplifier means, a second capacitor connected between the input to said amplifier and ground, and switch means in series with each of said resistive elements for selectively opening the circuit through each of the resistive elements.

8. A wave analyzer for analyzing a complex signal as claimed in claim 5 including, means for selectively varying the bandwidth of each of the low-pass filters.

9. A wave analyzer for analyzing a complex signal as claimed in claim 5 in which,
  each of the low-pass filters in each of the first and second channels comprising a plurality of filter circuits connected in series,
  the filter circuits comprising a network of resistance elements, capacitors and voltage follower means,
  and switch means for selectively switching the resistance element in and out of the filter circuits without setting up a low-impedance path to discharge the capacitors.

10. A wave analyzer for analyzing a complex signal as claimed in claim 1 in which,
  the heterodyning means including filter means with a pass band set to the sum frequency of the reference signal frequency and the tuned signal frequency.

11. A wave analyzer for analyzing a complex signal as claimed in claim 10 including,
  phase lock loop circuit means responsive to the tuned carrier signal for generating and supplying second tuned carrier signal to the data modulator means having the same phase and frequency of the sum frequently of the reference signal frequency and tuned signal frequency with all other signals being removed.

12. A wave analyzer for analyzing a complex signal as claimed in claim 11 in which,
  the phase lock loop circuit means comprising a voltage controlled oscillator means responsive to a control signal for providing an output signal having a given frequency,
  and means for receiving the tuned carrier signal and providing a control signal to the voltage controlled oscillator corresponding to the frequency of the tuned carrier signal.

13. A wave analyzer for analyzing a complex signal as claimed in claim 1 including,
  rectifier circuit means for receiving the output signal and providing a rectified output.

14. A wave analyzer for analyzing a complex signal as claimed in claim 1 including,
  demodulator means for mixing the tuned carrier signal and the output signal,
  and filter means responsive to the output of said modulator means for producing a signal having a frequency equal to the difference frequency of the tuned carrier signal and the output signal.

* * * * *